UNITED STATES PATENT OFFICE.

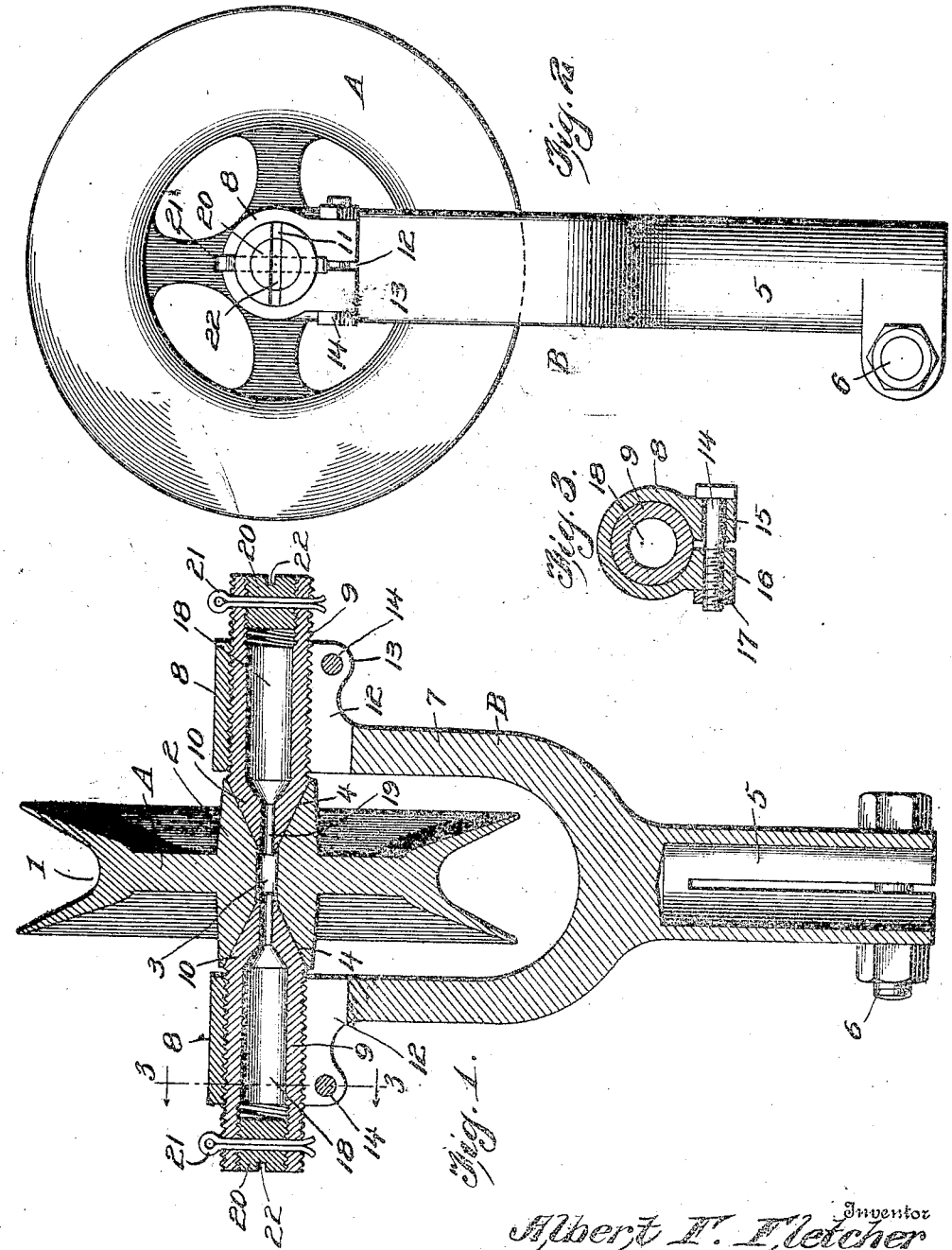

ALBERT F. FLETCHER, OF CLEVELAND, OHIO.

CONICAL PIVOT-BEARING.

945,712.   Specification of Letters Patent.   Patented Jan. 4, 1910.

Application filed November 3, 1908. Serial No. 460,855.

*To all whom it may concern:*

Be it known that I, ALBERT F. FLETCHER, a citizen of the United States, residing at Cleveland, in the county of Cuyahoga and State of Ohio, have invented new and useful Improvements in Conical Pivot-Bearings, of which the following is a specification.

This invention relates to bearings and relates more particularly to improvements in bearings and lubricating means for wheels and shafts whereby easy running of the wheel or shaft is secured, the life of the wheel or shaft increased by the reduction of wear, and the electrical resistance lessened, in case of trolley wheels.

The invention has for its objects, the reduction of vibration in the bearing parts, and to provide a device which is reliable and efficient in use, and composed of comparatively few parts.

Another object of the invention is the provision of a wheel mounted on conical bearings, the bearings being chambered to receive lubricant that is fed to the hub of the wheel to effectively lubricate the bearing surfaces.

A still further object is to improve the construction of the cone bearings whereby the same can be easily and quickly adjusted to take up wear.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a central transverse section of a trolley wheel and harp. Fig. 2 is a side view thereof. Fig. 3 is a section on line 3—3, Fig. 1.

Similar reference characters are employed to designate corresponding parts throughout the views.

Referring to the drawing, A designates a trolley wheel having a peripheral groove 1 for engaging the trolley wire, and the hub 2 of the wheel has a central bore 3 and conical bearing surfaces 4. The wheel is mounted in a harp B which has a split socket 5 into which the upper end of the trolley pole is inserted and clamped therein by the bolt 6 drawing two parts of the socket together around the pole. The arms 7 of the harp terminate in axially-disposed tubular extremities or sleeves 8 that are internally threaded to receive the journals 9 that are externally threaded. The inner ends of the journals are formed into cones 10 which extend into the hollow cone bearings 4 of the wheel to rotatably support the latter, the outer ends of the journals being provided with slots 11 for receiving a screw driver blade to insert, remove or adjust the journals. The sleeves 8 are slotted longitudinally at 12 in order to give resiliency thereto and said sleeves are formed with lugs 13 through which extend bolts 14 for clamping the journals 9 in the sleeves so that the journals cannot work loose after being set in proper position. As shown in Fig. 3, the bolt 14 for each sleeve passes freely through the aperture 15 in one lug 13 and is threaded in the aperture 16 of the other lug, so that by turning the bolt, the parts of the sleeve can be drawn together for clamping the journal therein. The bolt 14 extends out of the opening 16 to receive a nut 17 for the purpose of preventing the bolt from jarring loose. The journals 9 are hollow to provide chambers 18 for containing lubricant and these chambers discharge through passages 19 into the bore or chamber 3 of the trolley wheel so that lubricant can work outwardly between the cone bearings 4 and points 10 of the journals and effectively lubricate the surfaces. The high speed of rotation of the wheel will tend to force lubricant outwardly from the chamber 3 so that the bearing surfaces will be freely lubricated.

The outer ends of the journals are provided with plugs 20 that are threaded therein so as to prevent the leakage of lubricant and these plugs are held in place by cotter pins 21 that extend transversely through the outer ends of the journals and through the plugs, the plugs being formed each with a slot 22 for receiving a screw driver blade to remove or insert the plugs.

It will be observed on reference to Fig. 2 that when the plug 20 is in place and the cotter pin 21 in position, the slot 22 of the plug alines with the slot 11 of the journal. On reference to Fig. 1 it will be noticed that when the plug and cotter pin are in place the outer end of the plug comes flush with the outer end of the journal. After a journal has been supplied with lubricant and the plug 20 has been placed in position to close the outer end of the journal it may be known when the openings in the plug and journal register to receive the cotter pin by turning the plug 20 until its outer end comes flush with the outer end of the journal and until the slots 22 and 11 register, after which the cotter pin may be placed in position without any preliminary trial. It is further noted that when the plug 20 is in position and secured to the journal by the cotter pin 21, the journal may be screwed in or out by applying the screw driver solely to the plug or the screw driver may be moved so as to enter the slots 22 and 11 and thereby prevent straining of either one in the event of the journal being hard to turn.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the appended claim.

Having thus described the invention, what I claim is:—

In combination with a trolley harp, a trolley wheel, journals mounted in the arms of the harp and having screw thread connection therewith, said journals being hollow and having slots in their outer ends to receive a screw driver, plugs threaded into the outer ends of the journals for closing the same and formed with screw driver slots, and cotter pins passed through openings in the journals and plugs to retain the plugs in fixed position, the outer ends of the plugs coming flush with the outer ends of the journals and the screw driver slots in the plugs registering with the screw driver slots in the journals.

In testimony whereof I affix my signature in presence of two witnesses.

ALBERT F. FLETCHER.

Witnesses:
   Jos. H. Wenneman,
   Anna F. Fletcher.